Sept. 23, 1969  G. LE PECHON  3,468,423
APPARATUS FOR THE TREATMENT OF SUSPENSIONS
Filed July 15, 1968  2 Sheets-Sheet 1

Inventor
Guy Le Pechon
By
Cushman, Darby & Cushman
Attorneys

Sept. 23, 1969    G. LE PECHON    3,468,423
APPARATUS FOR THE TREATMENT OF SUSPENSIONS
Filed July 15, 1968    2 Sheets-Sheet 2

Inventor
Guy Le Pechon
By
Cushman, Darby & Cushman
Attorneys

United States Patent Office 3,468,423
Patented Sept. 23, 1969

3,468,423
APPARATUS FOR THE TREATMENT OF SUSPENSIONS
Guy Le Pechon, Sceaux, France, assignor to Rhone-Poulenc S.A., Paris, France, a French body corporate
Filed July 15, 1968, Ser. No. 744,883
Claims priority, application France, July 20, 1967, 114,998
Int. Cl. B01d 33/06
U.S. Cl. 210—360                                     3 Claims

ABSTRACT OF THE DISCLOSURE

A treatment apparatus wherein the suspension is fed to a tank having a cylindrical rotating filtering element therein and liquid is projected onto the exterior of the filtering element so that the jets detach the solid products from the filtering element, and at the same time liquor is extracted from the interior of the filtering element.

---

The present invention relates to apparatus for the treatment of the suspensions of solid products in liquids, in particular with a view to improving the quality of the said suspensions.

It is known that numerous solid products may, at any stage in their preparation or utilisation, be in suspension in a liquid; among a large number of other products, mention may be made by way of example of calcium carbonate, silica or alumina.

One problem which frequently arises relates to the manner of modifying the nature of the suspensive medium; for example, when preparing alumina by alkaline precipitation of an aqueous solution of aluminium salts, the aqueous saline solution which has formed during precipitation, and which contains the alumina in suspension, may be replaced by an aqueous medium which practically speaking no longer contains dissolved salts, so as to be able to isolate a sufficiently pure alumina.

Hitherto, the mode of operation adopted has been by successive decantation steps, elimination of the mother liquors which it proved possible to draw off without removing product, and replacement of the mother liquors eliminated by a certain quantity of a further suspension medium. A process of this kind is known to be long and to involve the utilisation of a considerable number of containers. The attempt has, in fact, been made to deposit the solid phase on a filter, whilst filtering the mother liquors, the product then being put into suspension. However, two difficulties are then encountered, firstly many products are extremely difficult to filter (such as silicas or aluminas) and secondly great difficulty is encountered in putting the solid product into suspension for the performance of the subsequent purification, preparation or utilisation phases.

In particular, a known apparatus of this type is disclosed in German specification No. 1,219,905 which comprises, within a sealed container under pressure, a horizontal drum carrying a filter cloth at its periphery.

The drum rotates about a horizontal axis and is entirely immersed in the suspension to be filtered, its upper portion being located in the vicinity of the liquid level. A fitting permits the introduction, under pressure, of the suspension to be filtered in the vicinity of the bottom of the container, parallel to the generatrices of the drum and substantially in the direction of rotation of the drum. Thus, this fitting combines its action with that of the drum movement and drives the suspension mass in rotation. The liquid filtered under the influence of pressure escapes through the hollow shaft of the drum, whereas the solid product deposited on the filter is scraped away mechanically, washed by atomisation and evacuated in the moist condition.

This design involves the disadvantages previously mentioned as inherent in this type of apparatus. Thus, the filter may become clogged if products which are difficult to filter are being processed. Furthermore, the solid product must necessarily be brought to a degree of compactness or density such that it is capable of being scraped away by mechanical means; this, if it is desired to recover the product in suspension, occasions the formation of lumps and the production of a non-homogeneous suspension. Furthermore, the solid product, since it has been subjected merely to brief hydroextraction and washing, will in many cases remain soiled by the impurities contained in the starting suspension.

According to the invention there is provided apparatus for the treatment of suspensions of solid products in liquids, such apparatus comprising a cylindrical element having its cylindrical wall formed as a filtering element, and mounted with its axis substantially vertical, a tube extending interiorly of said cylindrical element and opening near the lower end thereof, a liquid inlet shaped to project liquid against the exterior of said filtering element at an angle of 20° to 80° to a radius of the element at the point of impact of the jet and means for rotating said cylindrical element relative to said liquid inlet.

Most preferably the liquid inlet has to be positioned in such way that the emerging jet should be in a direction opposite to the direction in which the cylindrical element is able to rotate.

In order that the invention may more readily be understood, the following description is given, merely by way of example, reference being made to the accompanying drawings, in which.

Figure 1:
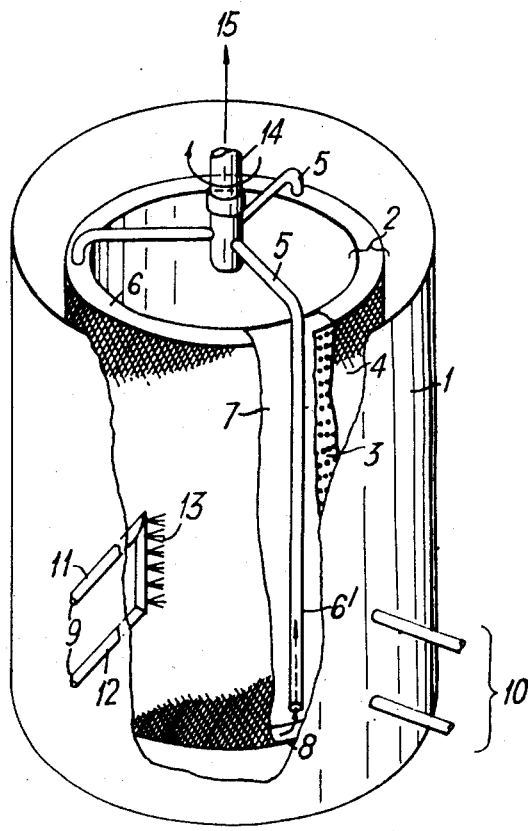
FIGURE 1 shows a perspective view of one embodiment of apparatus, according to the invention, with some parts being shown broken away, in order to show the construction thereof more clearly.

The apparatus shown in FIGURE 1 comprises an outer tank 1 in which rotates, in a clockwise direction, a double walled element 2 which is driven by means (not shown).

The inner wall of the element 2 is solid, whereas its outer wall 3 is perforated and covered with a filter cloth 4. Two flanges 6 and 8 close the double cylinder at the upper and lower portions thereof. Into the space between the walls of the element 2 extend, in fluid tight manner, conduits 5 which extend axially at 6' to a short distance from the lower flange 8. The conduits 5 are connected to a pipe 14 which is centered on the axis of rotation of the cylindrical element, the pipe being connected to a vacuum source. A plurality of liquid inlets 9, 10, shaped as a stirrup arrangement 11, 12, feed nozzles 13 disposed in such manner that they supply a flat jet impinging on the cylindrical element in the direction opposite to that of rotation and at an approximate angle of 45°. As can be seen from the figure, the liquid feed is distributed at the various locations so as to cover the total height of the cylinder and is advantageously distributed over its periphery (for clarity in the drawing, only two feeds have been shown).

Figure 2:
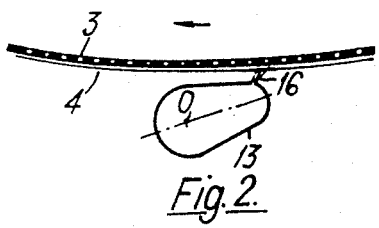
FIGURE 2 shows, in section, a detail of the outer face of the cylindrical element and an element projecting the liquid on to the said cylindrical element.

FIGURE 2 shows a horizontal section through the perforated outer wall of the rotary cylinder 3, with the filter cloth covering its surface, 13 designates a shaped nozzle preferably of substantially oval cross-section, the nozzle being elongated and formed with a longitudinal aperture 16 through which a flat jet of liquid emerges. By rotation about the axis O or by displacement of the stirrup assembly in its vertical plane, it is possible to alter the spacing between the slot 16 and the wall of the cylindrical element and to adjust the position thereof.

In the treatment of suspensions using the described apparatus, the tank 1 is filled with the suspension to be treated, and the cylindrical element, which is then immersed in the suspension, is rotated. By evacuating through pipe 14, the suspension is filtered and the solid elements thereof are deposited on the cloth 4, whereas the liquid portion passes into the moving cylinder and via the conduits 6', 5 and 14, is evacuated at 15 towards the source of vacuum. If liquid is fed through the liquid inlets 9, 10, there are produced within the mass of suspension jets of liquid which detach the solid elements which had been deposited on the filter cloth and restore them into suspension.

The feeding of the liquid through the nozzles may be effected continuously or discontinuously, and the liquid itself may be the fresh liquid in which it is being endeavoured to produce the suspension, the suspension itself, or the liquid extracted at 15 through pipe 14, or any other mixture of these various liquids.

If the quantity of noncharged liquid introduced into the system (considered in its entirety) exceeds the output of liquid extracted at 15, the suspension is diluted up to the volume limit of the apparatus. If the quantity of noncharged liquid introduced into the system is lower than the output extracted at 15, the suspension will be concentrated. When the two quantities are equal, constant concentration will be maintained.

It will also be possible to concentrate the suspension by feeding the liquid inlets 9, 10 with suspension at a flow rate equal to that of the liquid extracted at 15 and by eliminating, at 15, the desired quantity of liquid, so as to attain the desired concentration. The feed pressures of the various liquid inlets may be regulated in such manner that the solid product is, in every case, detached from the filtering surfaces and returned into suspension. The value of the negative pressure employed for aspiration at 15 has considerable bearing on this point.

It will be clear that, in the apparatus according to the invention, the cylindrical element may remain constantly immersed and that, furthermore, with each revolution, the filtering surface passes in front of a jet of liquid, thus providing excessive clogging by the solid product, the accumulation of the latter on the filtering element and, doubtless for these reasons, the solid product is constantly returned into suspension, in such manner that there is always a suspension free from accumulations and which is perfectly homogeneous.

The nature of the suspension medium may very rapidly be changed, by feeding the liquid inlets with the desired medium. The apparatus according to the invention is thus especially suitable for the processing of suspensions of clogging or delicate products, such as suspensions of magnesia, hydrated silica and alumina.

It will also be appreciated that, since the cylindrical element remains, normally, entirely immersed and since the jets of product open normally below the surface of the liquid filling the apparatus, it is possible to prevent, during the entire period of operation, any contact between the products in suspension and atmosphere. It is also possible to complete such protection by providing the apparatus with a lid and injecting an inert gas therein. In this way, it is possible to obtain an industrial means of treating products which are for example highly oxidisable, such as fine metallic powders or certain suspensions of organic products.

The rotation of the cylindrical element is produced by any conventional means, such as an electrical motor. Such driving may be effected via the pipe system 14, which will then be a hollow shaft from which the cylindrical element will be suspended, for example by means of conduits 5. This arrangement may be useful above all for apparatus of small dimensions, the tank 1 then being removable so that it may for example be lowered in order to permit the disengagement of the cylindrical element, for the purpose of inspection or other necessary work.

It is even possible to dispense with the tank 1 and simply to immerse the cylindrical element and the liquid feed jets in a reservoir containing the suspension, but this arrangement is exceptional.

The rotation of the cylindrical element may also be performed by means of an axial shaft extending downwardly from the element. In this case, driving is effected from below and vacuum intake is effected separately from above, with the tank 1 being fixed to the drive system and the cylindrical element being removable upwardly. The joining of the cylindrical element and of the device for driving in rotation may be effected in a conventional manner.

If desired, the cylindrical element 2 may have a bottom 8 which closes the entire section of the cylinder. The cylindrical element then takes the form of a double-walled cylinder having a closed lower end face. Immersed in the liquid constituted by the suspension to be treated, it undergoes the hydrostatic pressure thereof; if the said cylinder is filled with a suitable quantity of liquid, hydrostatic equilibrium may be substantially obtained in the assembly, thus diminishing the mechanical forces required to hold the cylindrical element.

The cylindrical element may also be constituted by a simple cylinder closed at the lower portion and open at the upper portion. The liquid will then filter spontaneously through the filtering wall and the assembly serving for the setting up of a vacuum in the double wall (as described) may then be replaced by a simple system for the evacuation of filtered liquid. It is quite clear that an arrangement of this kind will only be suitable for relatively small filtration outputs.

Instead of constituting the cylindrical element as a double-walled cylinder (as described) it may be designed in the form of a simple cylinder which is closed at both ends and the lateral wall of which is a filtering wall. However, this device has the disadvantage that its inner volume (in which the vacuum is to be maintained) is considerable relatively to the utilisable filtration surface.

As already stated, the two inner and external surfaces of the double-walled cylinder are utilisable as a filtration surface, but due to technical difficulties associated with the installation of surface filtering layers on the inner wall, this solution is not often attractive.

The filtering wall has been described as a perforated wall covered with a filter cloth. It would of course be possible to utilise any filtering surface appropriate to the products to be treated, for example a sleeve of sintered metal. The perforated wall having a filter cloth is of course the simplest in the majority of cases. By appropriately selecting both the type of perforated wall (number of perforations, shapes, wall surfaces), and the type of filter cloth (woven or nonwoven, porosity) and even by using, in place of a cloth, a filtering film such as a cellulose membrane, it will be possible to treat any suspension and even to go as far as ultra-filtration.

Thus, it will be appreciated that it is possible to provide, according to the invention, both powerful industrial apparatus and also small laboratory apparatus for special cases.

It should be noted that the apparatus normally comprises a tank which may optionally be closed and may also, if desired, readily be sterilised.

The liquid inlets and the liquid feed nozzles may be designed in many ways. FIGURES 1 and 2 show a more typically industrial form of embodiment: a stirrup having two liquid inlets and nozzles distributed over the stirrup. This device is useful above all when it is desired to achieve a relatively large liquid output. It would, of course, be possible to provide only a single inlet.

The figure shows the liquid inlets distributed over the height and periphery of the cylindrical element, this arrangement being especially advantageous for large dimension industrial plant. It is quite clear that it would be possible to vary the number and position of the liquid inlets, depending on the special problems involved, provided that the lateral surface of the cylinder is swept practically entirely by the jets of liquid.

Such sweeping may also be obtained by using a single cleaning nozzle to which an appropriate upward and downward movement along a generatrix of the cylinder is imparted; this involves mechanical difficulties but, if it is employed, it enables the utilisation of a liquid flow rate which is lower insofar as it suffices to feed a single nozzle.

The nozzles may be of any known type, preference being given to a flat jet parallel to the generatrices of the cylinder.

Naturally, the jet of liquid may be continuous, variable or pulsatory, depending on the special problems to be solved.

The apparatus may be constructed from any materials such as are conventionally used in boiler-making, i.e., metals, alloys, glass, plastics materials, coated materials, in accordance with the conventional rules of chemical engineering, and depending on the nature of the suspensions to be treated.

The force of the jets and also their exact angle of attack on the outer wall of the cylindrical element are advantageously regulated in each special case, an angle of attack of approximately 45°, a feed pressure of the order of 2 to 3 kg./cm.$^2$ and a distance between the orifice from which the liquid emerges and the wall of the cylindrical element of 5 to 10 mm., are generally satisfactory. The angle of attack may be from 20° to 80° to the radius at the point of impact of the jet.

The following example is given to illustrate the use of the apparatus.

EXAMPLE

Figure 3:
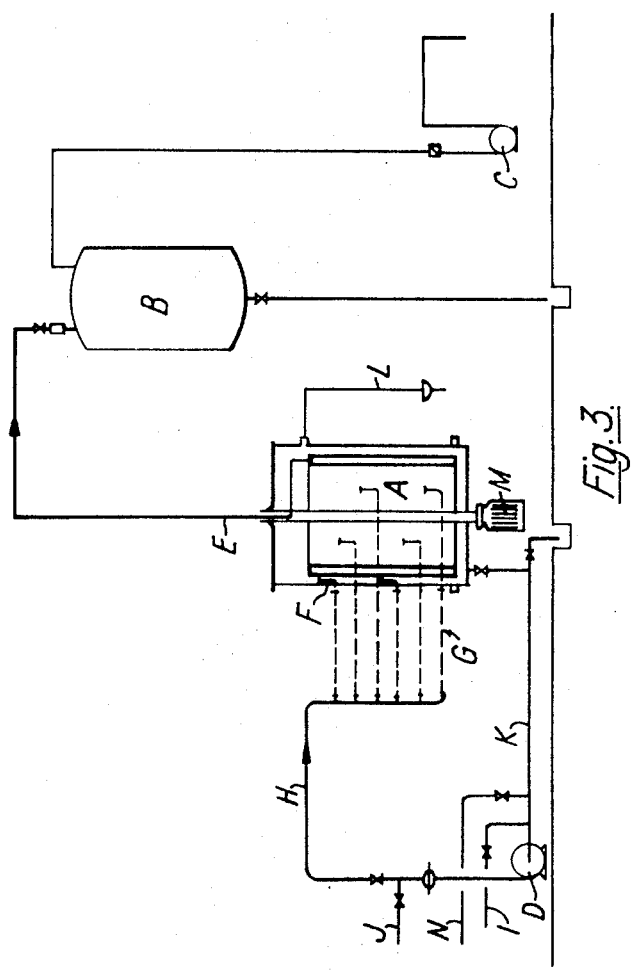
FIGURE 3 shows, by way of example, a complete assembly for the treatment of a suspension, and including an apparatus according to FIGURE 1.

An installation is shown diagrammatically in FIGURE 3, which incorporates an apparatus A according to FIGURE 1, provided with an overflow L and having a cylindrical double-walled element the inner face of which is entirely closed. The cylindrical element is rotated at 10 r.p.m. by an electric motor M rotated laterally of the apparatus and the drive shaft of which extends through the bottom of the tank 1, through a stuffing box. Five liquid inlets F provided with nozzles are distributed over the entire height of the cylindrical element and around over the periphery thereof, the nozzles being disposed in such manner as to sprinkle the entire outer face of the cylindrical element. The said nozzles have the section shown in FIGURE 2 with a longitudinal slot, 210 mm., long and 0.5 mm., wide. They are orientated in such manner that the slot is disposed 10 mm., from the wall of the cylindrical element. The tank 1 has a diameter of 1200 mm., and a height of 1700 mm., while the cylindrical element has a diameter of 1100 mm., and a height of 1400 mm., so that the apparatus is able to contain 600 litres of suspension. The filtering surface is constituted by a cotton filter cloth supported by means of a metal wire which is spirally wound on the outer face of the cylindrical element, which is formed from a stainless steel perforated cloth having circular apertures of diameter 7 mm., in offset rows, with the aperture axes 10 mm., apart. The inner wall of the cylindrical element is of solid 2 mm., sheet materials, cross-bracing members provide, at intervals, to space the two lateral walls of the cylindrical element 50 mm., apart. Into this space descend three 10 mm., diameter tubes joined to the hollow shaft of the cylindrical element.

A vacuum conduit E connects the apparatus to a reservoir B, which is evacuated by a liquid-ring vacuum pump C.

The five liquid inlets F are connected by flexible tubing G to the delivery portion of a centrifugal pump D, capable of providing a normal output of 50 m.$^3$/h. under a pressure of 3 kg./cm.$^2$, the suction portion of which is connected to a pipe K which is connected to the apparatus A, and to a pipe system M permitting the inflow of the suspension or to pipe system I for the inflow of water. Evacuation of the products derived from the delivery of the pump D may be effected through pipe J, a set of valves making it possible to provide the desired branch conduits.

First of all a suspension of alumina hydrate containing 8% of $Al_2O_3$ (prepared by treating a solution of alumina sulphate with a solution of sodium bicarbonate, in the cold state) is introduced through a conduit N, simultaneously setting up a vacuum on the apparatus and feeding the nozzles with the same suspension, using for this purpose the circuit formed by the pipe K, the pump D, the pipe H, the flexible tubes G and the inlets to the nozzles F. The suspension contained in the apparatus is thus concentrated.

The inflow of fresh suspension is regulated so as to maintain a constant level in the filter. When the desired concentration has been achieved, the inflow of suspension through M is halted, the pipe K is closed and water is introduced through pipe system I, in such manner as to maintain a constant level in the apparatus.

In approximately 2½ hours, a suspension of alumina in water is obtained, of which the suspension medium is practically free from sodium sulphate. By ceasing the supply of water, washing and continuing suction, the volume is brought to 350 litres in 15 minutes. Then, after having interrupted the feeding of the nozzles, the product contained in the apparatus is evacuated through pipes J and H. The apparatus is then ready for a further operation.

I claim:

1. Apparatus for the treatment of suspensions of solid products in liquids, said apparatus comprising, in combination:
    (a) a double-walled cylindrical element mounted in a tank with its axis substantially vertical;
    (b) means to rotate said cylindrical element about its axis in a given direction; said cylindrical element including;
    (c) an inner imperforate wall;
    (d) an outer perforated wall, spaced from said inner wall;
    (e) a filtering element exteriorly covering said perforated wall;
    (f) a bottom flange extending between said inner and outer walls to close the lower end of said cylindrical element;
    (g) at least one tube extending interiorly between said inner and outer walls;
    (h) an opening defined in said tube near the lower end of said cylindrical element; and
    (i) a liquid inlet exteriorly of said cylindrical element, effective to project liquid on the exterior of said cylindrical element at an angle between 20° and 80° to a radius of said cylindrical element at the point of impact in a direction opposite to said given direction.

2. Apparatus as claimed in claim 1, wherein said liquid inlet is in the form of a stirrup shaped pipe, a cross-member to said pipe having a longitudinal slot formed therein.

3. Apparatus as claimed in claim 2, wherein a plurality of said liquid inlets are located around said cylindrical element at different axial and circumferential locations, effective to project liquid against the full length of said cylindrical element.

References Cited

UNITED STATES PATENTS 3,363,771  1/1968  Walters _____ 210—360

FOREIGN PATENTS 983,989  2/1965  Great Britain.

JAMES L. DE CESARE, Primary Examiner

U.S. Cl. X.R.

210—391, 402